United States Patent [19]

Rupp et al.

[11] Patent Number: 5,285,948
[45] Date of Patent: Feb. 15, 1994

[54] REFLOW SOLDER AND STATIC TEST STATION

[75] Inventors: Rick E. Rupp, Berthoud; John D. McCrandall; Dennis L. Zekoff, both of Longmont, all of Colo.

[73] Assignee: Maxtor Corporation, San Jose, Calif.

[21] Appl. No.: 877,941

[22] Filed: Apr. 30, 1992

[51] Int. Cl.⁵ ............................................. B23K 37/047
[52] U.S. Cl. .................................... 228/104; 29/593; 228/6.2
[58] Field of Search .................. 228/6.2, 8, 103, 104; 29/593

[56] References Cited

U.S. PATENT DOCUMENTS

| | | | |
|---|---|---|---|
| 4,255,851 | 3/1981 | Fortuna | 29/593 X |
| 4,696,104 | 9/1987 | Vanzetti et al. | 29/593 X |
| 4,868,973 | 9/1989 | Fujishiro | 29/593 X |

*Primary Examiner*—Kenneth J. Ramsey
*Attorney, Agent, or Firm*—Blakely, Sokoloff, Taylor & Zafman

[57] ABSTRACT

In the assembly and testing of hard disk drive systems, a station having the capability of performing soldering and testing operations on a disk drive subassembly unit, such as a head gimbal assembly. The subassembly unit is placed onto a fixture. The fixture firmly holds the subassembly unit during both the soldering and testing operations. Wires are reflow soldered onto solder pads of a flex circuit. Afterwards, the subassembly unit is subjected to a variety electrical tests. The results of these tests are displayed to the operator. If these results indicate that there might be a problem with the wiring and/or soldering, the operator can readily "retouch" or resolder the wiring and repeat the testing procedure to verify that the remedial measures have corrected the problem.

23 Claims, 6 Drawing Sheets

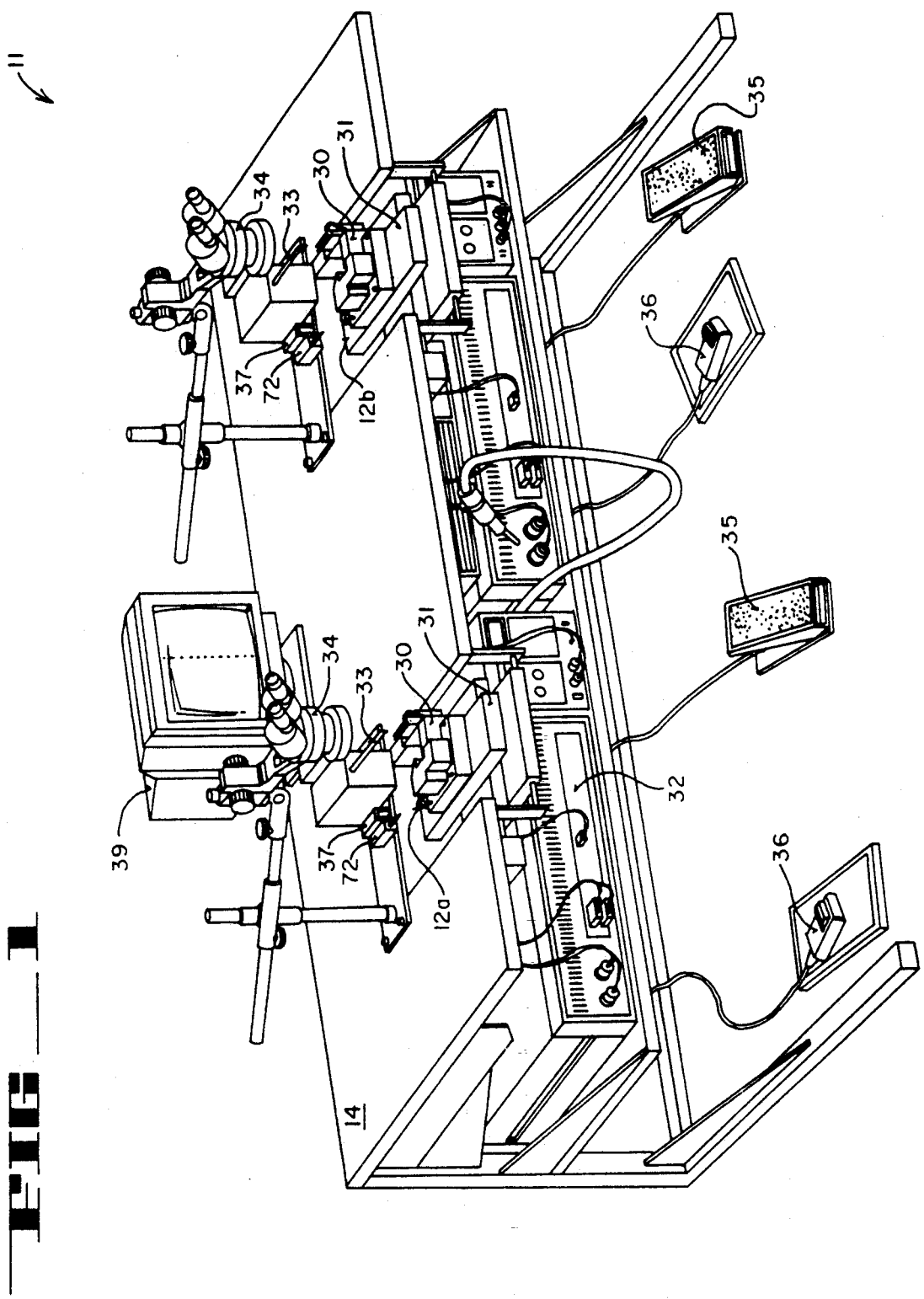

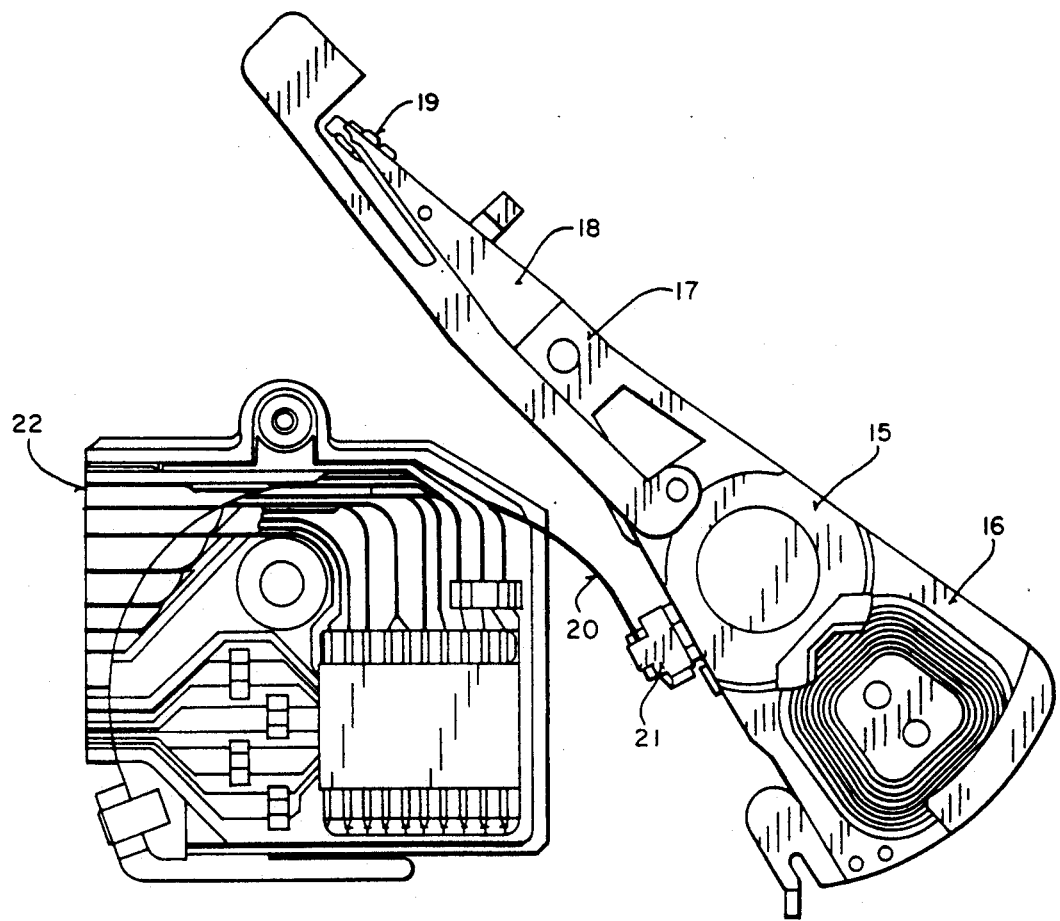
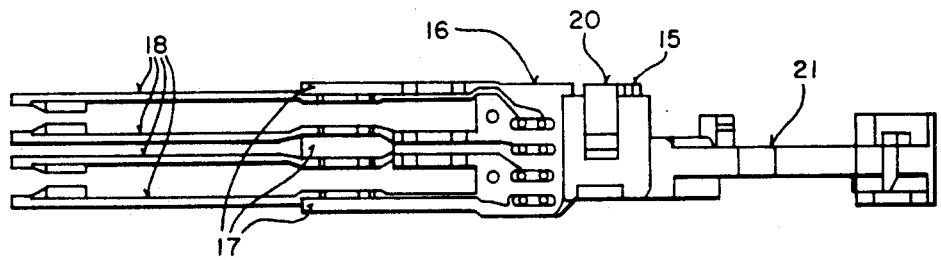

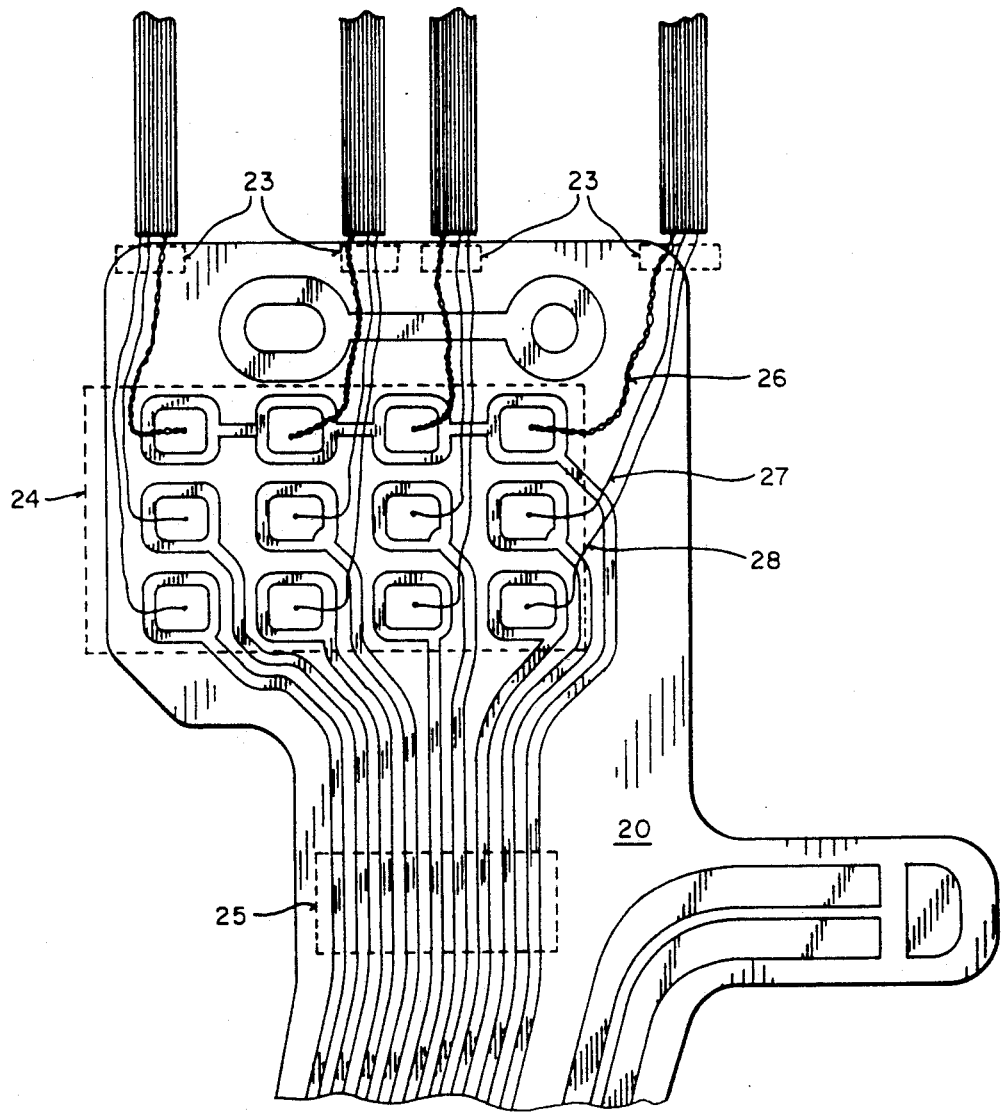
FIG_3

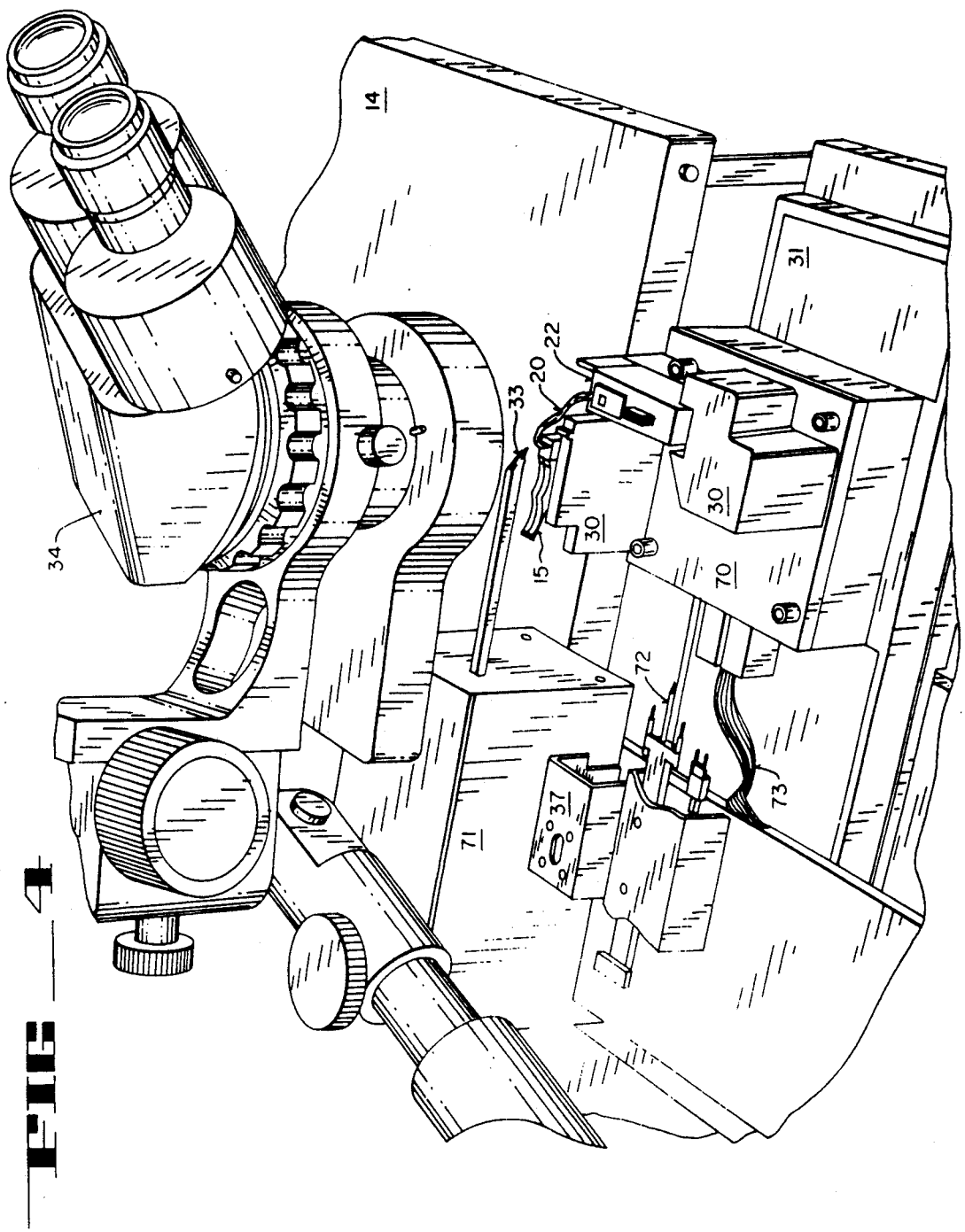

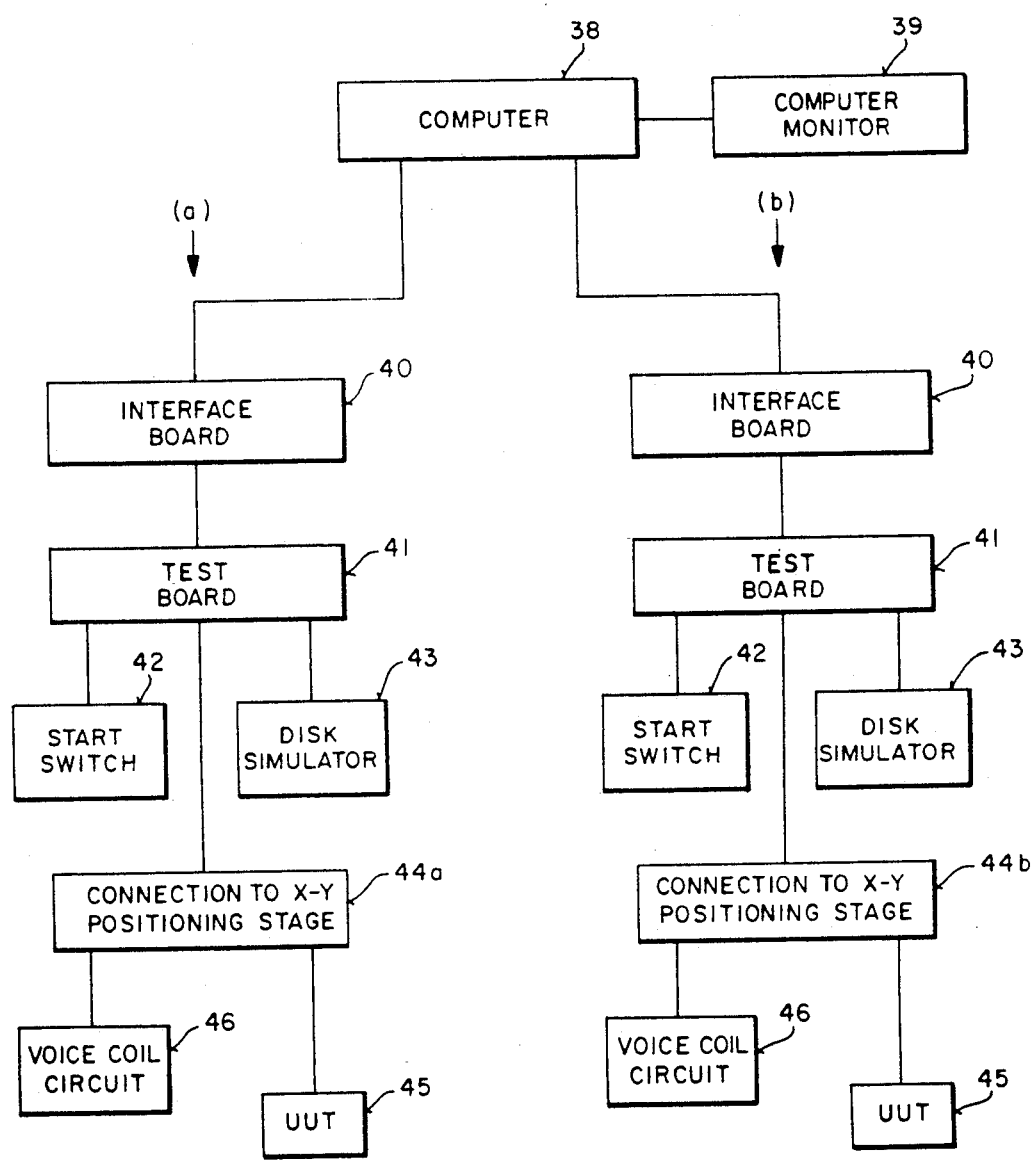

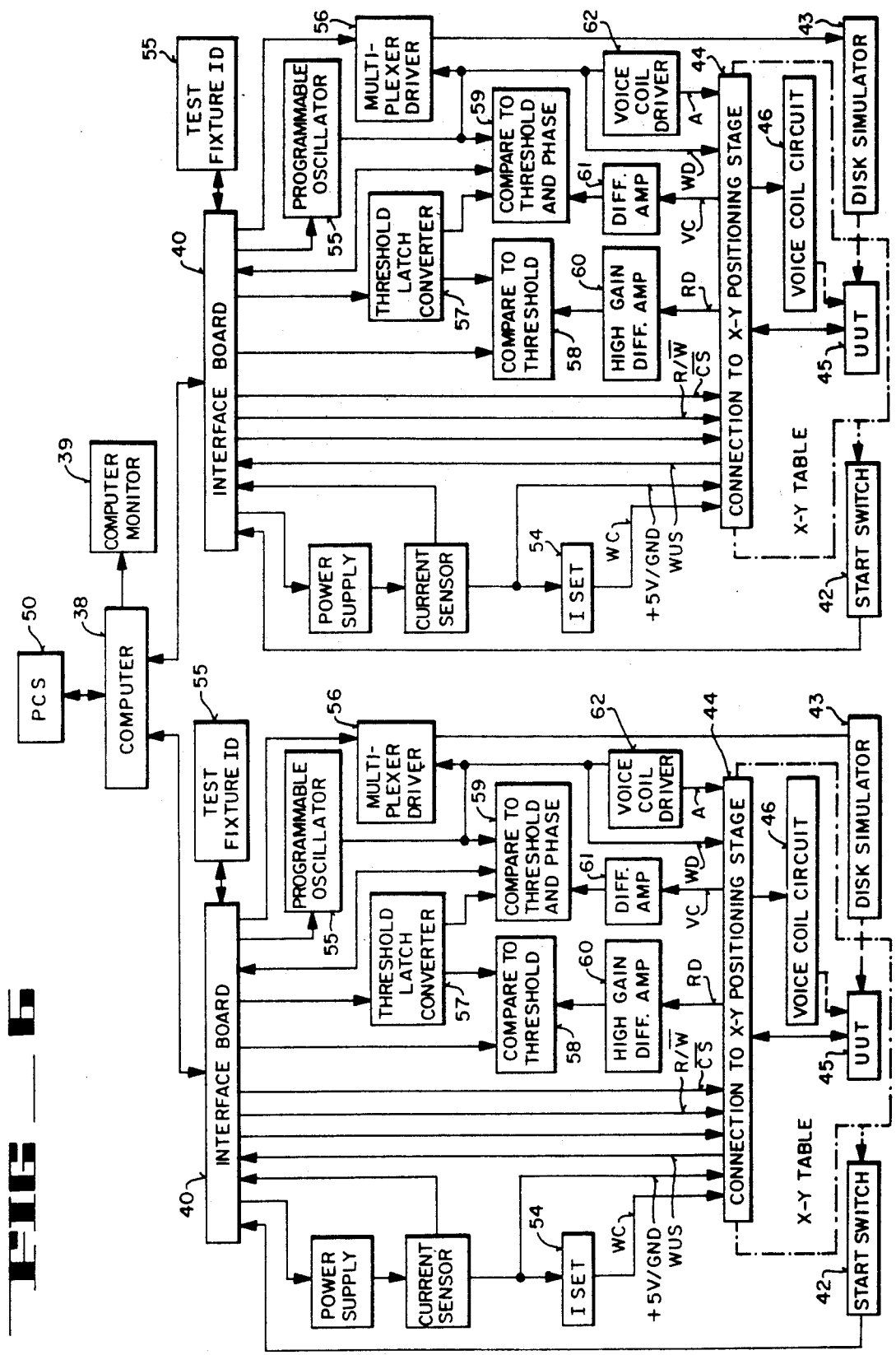

REFLOW SOLDER AND STATIC TEST STATION

FIELD OF THE INVENTION

The present invention relates to the field of assembly stations used in the manufacturing process of disk drive systems; more specifically, to an assembly station which combines both soldering and testing operations for head gimbal assemblies used in hard disk drive systems.

BACKGROUND OF THE INVENTION

Hard magnetic disk drives (also known as fixed disk drives, rigid disk drives, and Winchester drives) are popularly used in conjunction with computers to store digital information. In the field of manufacturing hard magnetic disk drives various subassemblies are typically assembled first from individual components. These subassemblies are then integrated together and set within a housing to form the completed disk drive system. One such subassembly which is critical to disk drive operations is known as the head gimbal assembly (HGA).

The HGA is typically comprised of an actuator, flexures, magnetic transducers (also known as "heads"), sliders, and a coil. The actuator has a plurality of arms extending outwards. Mounted at the end of each arm is a flexure to which a head is affixed. The head is used to write bits of information onto a circular magnetic disk which magnetically stores the information. Later, the head can retrieve or read the stored information from the disk.

Sliders straddle the head so that the head can "fly" across the top of the circular magnetic disk. Multiple disks are stacked on top of one another in order to increase the storage capacity. When an electrical current is applied to the coil, the HGA moves the heads radially across the stack of circular magnetic disks with each head accessing one disk. An electrical motor rotates the stack of disks about a spindle. By moving the heads radially across the disks as the disks are rotated, data can be written onto and read off the disks as a series of bits arranged in concentric "tracks".

In manufacturing the HGA's, the magnetic wires which are electrically coupled at one end to the heads need to have their other ends soldered onto a flex circuit. These magnetic wires are used to conduct electrical signals between the heads and a flex circuit. A flex circuit is a thin, flexible length of plastic embedded with conductors. Since the HGA is pivoted quite frequently (in order to position the heads over the desired portion of the disk), electrical wires would eventually break due to fatigue. Hence, a flex circuit is used to electrically couple the heads to the rest of the disk drive system. Thereby, a computer can send appropriate electrical signals instruction the hard disk drive to store certain digital data. The disk drive system passes the digital data via the flex circuit through the magnetic wire to the head which then writes the digital data onto the magnetic disk.

Similarly, a computer can instruct the hard disk drive to retrieve the stored data. The disk drive command the HGA to position the appropriate head over the portion of the disk containing the desired data. The head then reads the magnetic data off the disk and converts it into an electrical signal. The electrical signal is sent to the rest of the disk drive system via the magnetic wires and the flex circuit. The disk drive system processes the electrical signal (e.g., amplified, filtered, perhaps decompressed, etc.) and then sends it to the computer.

The magnetic wires can be manually soldered onto the flex circuit. However, a faster, more efficient method is to use a reflow soldering technique. First, the HGA is placed in the reflow solder fixture to firmly hold it in place during the reflow soldering process. In reflow soldering, the solder pads of the flex circuit are first prepared with solder. The fixture is moved so that a solder pad is positioned under the reflow solder tip. The corresponding magnetic wire is then pulled over the solder pad. The tip is then lowered onto the magnetic wire and solder pad. The tip is heated so that it burns off the insulation on the magnetic wire and melts the solder. Thereby, the magnetic wire is soldered onto the solder pad of the flex circuit. The operator pulls off any excess wire by means of tweezers. This process is repeated for each magnetic wire. For forty megabyte hard disk drives, typically six magnetic wires must be soldered. For eighty megabyte hard disk drives, typically twelve magnetic wires must be soldered.

After the magnetic wires are soldered onto the flex circuit, the assembled HGA is removed from the reflow solder fixture. A plastic head protector is often placed over the heads. The head protector acts as a safeguard against damages from handling. Each assembled HGA is then placed on carrying containers. The carrying containers are transported down to a static test station. The head protector is removed, and the assembled HGA is subjected to electrical tests which tests certain electrical performances of the HGA to verify that it is working properly.

However, there are numerous problems associated with this prior art manufacturing process. One major disadvantage is that because the HGA is extremely delicate, especially the heads and the magnetic wires, it is highly susceptible to being damaged each time it is handled. In the prior art manufacturing process, the HGA is handled quite frequently (i.e., the HGA must be inserted into and removed from the reflow solder station, the head protector is fitted onto and detached from the HGA, the HGA is placed onto and removed from the carrying tray, and the HGA is inserted onto and removed from the static test station).

Another disadvantage is that as the carrying containers are queued to the static test station, a Work In Progress (WIP) buildup results. In other words, there is no immediate feedback on what was just performed. The feedback is delayed. This adds to the complexity of tracking the overall manufacturing cycle.

Yet another problem is that, typically, the person who operates the reflow solder station is not the same person who operates the static test station. Hence, the operator of the reflow solder station does not know whether he or she is performing the soldering correctly. For example, if the operator mistakenly believes that a particular wire is to be soldered to a particular solder pad or otherwise incorrectly performs the soldering procedure, the operator is likely to repeat the error because there is no immediate feedback informing the operator of the error.

Still another disadvantage with the prior art is that it is inefficient. If the static test station detects an error attributable to incorrect soldering, the HGA must then be removed from the static test fixture, the head protector must be refitted over the heads. It must then be carried back to the reflow solder station. Operation of the reflow solder station must be halted so that the failed HGA may be substituted. The head protector must be removed, and the failed HGA is inserted into the reflow solder fixtured and "touched up." Then, the "touched up" HGA is removed from the reflow solder fixture. The head protector is refitted. The HGA is carried back to the static test station. The head protector is removed, and the HGA is reinserted back in the static test fixture. The HGA is again subjected to the electrical performance tests to make sure that the "touch ups" fixed the problem. If the HGA fails the tests, the procedure described above must be repeated. Thus, the prior art manufacturing process is inefficient and results in wasted time and effort.

What is needed then is an assembly station which integrates both the reflow soldering and testing operations for a more simple, efficient manufacturing process.

SUMMARY AND OBJECTS OF THE INVENTION

In view of the limitations of the prior art assembly stations used in the manufacturing process of hard disk drive systems, it is one objective of the present invention to implement a single assembly station which integrates the reflow solder operation with the static test operation so that both operations can be performed on that station by a single operator.

Another objective of the present invention is to minimize the number of times the HGA is handled during the assembly and testing process, thereby reducing damage due to handling.

Another objective of the present invention is to provide immediate feedback to the operator of the quality and performance characteristics of the soldering procedure.

Yet another objective of the present invention is to increase the efficiency of the assembly and testing processes.

These and other objects of the invention are provided for by a single assembly station which has the capability of performing a reflow soldering operation along with a static test operation. Thus, an operator can perform both operations on a disk drive subassembly (e.g., a head gimbal assembly) at a single station. In one preferred embodiment, the subassembly unit is placed onto a fixture. The subassembly unit remains firmly held by the fixture throughout both the reflow soldering and testing operations. First, reflow soldering is performed on the subassembly unit. Upon completion, the subassembly unit is subjected to a variety of electrical tests. The results of these tests are displayed to the operator. If these results indicate that there might be a problem with the wiring and/or soldering, the operator can readily "retouch" or resolder the wiring and repeat the testing procedure to verify that the remedial measures have corrected the problem.

Other objects, features, and advantages of the present invention will be apparent from the accompanying drawings and from the detailed description which follows below.

BRIEF DESCRIPTION OF DRAWINGS

The present invention is illustrated by way of example and not limitation in the figures of the accompanying drawings, in which like references indicate similar elements, and in which:

FIG. 1 is a perspective view of the currently preferred embodiment of the present invention.

FIG. 2a is a top view of a head gimbal assembly coupled to electronic circuitry by means of a flex circuit.

FIG. 2b is a side view of a head gimbal assembly.

FIG. 3 is a drawing of a flex circuit with various wires connected to solder pads on the flex circuit.

FIG. 4 is a more detailed perspective view showing the static test fixture and its surroundings.

FIG. 5 is a block diagram of one embodiment of the present invention.

FIG. 6 is a more detailed block diagram of one embodiment of the present invention.

DETAILED DESCRIPTION

In the field of manufacturing hard disk drive systems, a single assembly station which integrates a reflow solder operation with a static test operation so that both operations can be performed on that station by a single operator is described. In the following description, specific details are set forth, such as voltages, currents, frequencies, etc., in order to provide a through understanding of the present invention. It will be obvious, however, to one skilled in the art that these specific details need not be used to practice the present invention. In other instances, well-known structures and circuits, have not been shown in detail in order not to unnecessarily obscure the present invention.

FIG. 1 is a perspective view of the currently preferred embodiment of the present invention. In one preferred embodiment, assembly station 11 has two separate, duplicate reflow solder and static tester work stations as shown by 12a and 12b. Two duplicate work stations are implemented in order to increase the speed of the assembly and testing process since two disk drive subassembly units can be operated upon at the same time on assembly station 11 by two operators. Two separate, duplicate work stations are preferred in that one set of testing equipment can be shared by both work stations. Such an arrangement reduces the requirement for dedicated sets of test equipment. Two separate, duplicate work stations are also useful because in case one work station malfunctions, the other work station can be used as a backup. However, it would be obvious to one skilled in the art that the assembly station need not be limited to only two fixtures. A single work station or multiple work stations can be implemented for an assembly station. For the sake of clarity and simplicity, the following description will be applied to only one reflow solder and static tester work station.

In the preferred embodiment, assembly station 11 is placed within a "clean room" (a standard procedure found in the semiconductor industry for minimizing dust and other particles which might impair the manufacturing process). The operator wears a complete clean room suit. In addition, the operator wears a wrist strap which grounds the operator while working at the station to prevent damage to the subassembly unit under test due to static electricity.

The operator sits in front of the work station. A carrying container which holds a number of subassembly units are placed on top of table 14 within easy reach of the operator. By way of example, a Head Gimbal Assembly (HGA) will be used to demonstrate the present invention. However, it would be obvious to one skilled in the art that the present invention can be applied to various subassembly units other than HGA's.

The top view and the side view of an HGA 15 are shown in FIGS. 2a and 2b, respectively. It can be seen that HGA 15 is comprised of armset 16, three arms 17 extending from the armset body, flexures 18 coupled to the ends of the arms, and heads 19 held by the flexures 18. In the embodiment portrayed in FIGS. 2a and 2b, a stack of two disks can be accessed (40 megabytes). The HGA is positioned so that the top disk fits in between the top two heads, and the second disk fits in between the bottom two heads. A greater number of arms, flexures, and heads can be implemented in a similar manner in order to access more disks (e.g., five arms for 80 megabyte hard disk drives).

FIG. 2a also shows the flex circuit 20 which is affixed onto the side of armset 16 by means of actuator clip 21. The other end of flex circuit 20 is coupled to electronic circuitry 22. The purpose of flex circuit 20 is to conduct electrical signals between the HGA 15 and electronic circuitry 22. Flex circuit 20 is a thin, flexible length of plastic embedded with conductors. Since the HGA 16 is pivoted quite frequently, electrical wires would eventually break due to fatigue. Hence, flex circuit 20 is used.

Due to sizing constraints, it is impractical to run the flex circuit the length of the arms to the heads. Instead, magnetic wires are used to conduct electrical signals between the heads 19 and the flex circuit 20. The magnetic wires need to be soldered onto flex circuit 20. FIG. 3 is an enlarged view showing the twelve magnetic wires 23 which need to be soldered onto the twelve solder pads 24 on flex circuit 20 for an eighty megabyte hard disk drive system. Running from the solder pads down the length of flex circuit 20 are Conductors 25 embedded within flex circuit 20 which are used to electrically couple the solder pads 24 to the rest of the disk drive system. Conductors 25 conduct electrical signals between the magnetic wires 23 and the electronic circuitry of the disk drive system.

The magnetic wires 23 are soldered onto the flex circuit by means of a reflow soldering technique. First, the operator retrieves an HGA from the carrying container, removes the head protector, and inserts it onto the reflow solder and static tester fixture 30. The HGA is inserted on its side such that the flex circuit, solder pads, and magnetic wires are positioned at the top. Fixture 30 is designed to firmly hold the HGA in place. Fixture 30 is mounted on an X-Y positioning stage 31. The function of X-Y positioning stage 31 is to move in both the X and Y axes in a Cartesian coordinate system. In reference to the operator, X-Y positioning stage 31 moves left/right and towards/away in a horizontal plane. Since fixture 30 is mounted on X-Y positioning stage 31, the fixture follows the movements of the X-Y positioning stage 31. In this manner, the HGA which is held by fixture 30 can be moved along the X and Y axes in a horizontal plane. The X-Y positioning stage 31 is controlled by a position controller 32. In the preferred embodiment, a single position controller 32 controls both X-Y positioning stages (one in each of the two work stations). Position controller 32 is programmed to move the X-Y positioning stage in a series of steps. The program instructs the X-Y positioning stage to move fixture 15 such that for each step, a solder pad on the flex circuit is positioned under the tip of a stationary reflow solder tip 33. By executing each step, each solder pad is successively positioned under reflow solder tip 33.

After a solder pad is positioned under reflow solder tip 33, the operator selects and grasps a magnetic wire by means of a pair of tweezers. Tweezers are used because the magnetic wires are thin and need to be manipulated accurately. The operator then places a length of the magnetic wire over the appropriate solder pad. Because of the small scales involved, the operator typically peers through a microscope 34 in placing the thin magnetic wire over the tiny solder pad. Microscope 34 is mounted so that it overlooks the fixture 30 when the fixture is in the reflow solder mode position. Thereby, the operator can visually inspect the HGA either directly or through microscope 34 without having to move either fixture 30 or microscope 34.

The magnetic wires are matched to the appropriate solder pads in the following example. By way of illustration in FIG. 3, four heads are used to access two magnetic disks in an eighty megabyte hard disk drive system. Each head accesses one side of one disk. A set of magnetic wires 23 are electrically coupled to each head. Each set 23 is comprised of a twisted pair of magnetic wires 26, a red magnetic wire 27, and a gold magnetic wire 28. The solder pads 24 are arranged in columns. Each column corresponds to a head. Hence, there are three solder pads per column (i.e., one solder pad for each of the twisted pair 26, red 27, and gold 28 magnetic wires). In one embodiment, the twisted pair of magnetic wires 26 are soldered to the top solder pads of the column corresponding to that head. The red magnetic wires 27 are soldered to the middle solder pads of the column corresponding to that heads, and the gold magnetic wires are soldered to the bottom solder pads of the column corresponding to that head. In this manner each of the twelve wires (twisted pair counting as one wire) are correctly matched to each of the twelve solder pads. This is apparent in FIG. 3.

Once the appropriate magnetic wire is placed over the solder pad, it is reflow soldered onto that solder pad. In reflow soldering, the solder pads of the flex circuit are prepped with solder. The operator slowly depresses the large foot pedal 35 which slowly lowers reflow solder tip 33. The reflow solder tip 33 is lowered until is makes contact with the magnetic wire and solder pad. The operator then depresses the large foot pedal 35 completely to activate reflow solder tip 33 so that it melts the solder on the solder pad and burns off the insulation on the magnetic wire. When the solder melts, any excess magnetic wire is pulled off with tweezers by pulling it back and over the solder pad. The magnetic wire should be broken off at the edge of the bond. Thereby, the magnetic wire is soldered onto the solder pad. At the conclusion of the reflow soldering operation, the operator can visually inspect the solder bond through microscope 34.

The operator sequences to the next magnetic wire and solder pad by depressing foot switch 36. This prompts position controller 32 to step the X-Y positioning stage 31 per its software program so that the next solder pad is positioned under reflow solder tip 33 and is reflow soldered. This process is repeated for each magnetic wire until all the wires have been reflow soldered onto each corresponding solder pad.

After all reflow solder operations have been completed, the operator again depresses foot switch 36 to initiate the static testing procedure. When foot switch 36 is depressed this time, the position controller 32 instructs the X-Y positioning stage 31 to place the heads on the HGA in close proximity to the disk simulator 37. This is known as the static test position. A start switch is placed such that the fixture 30 will activate the start switch when the fixture is in the static test position. In the currently preferred embodiment, the start switch is in the form of a pogo pin 72. When the start switch is tripped, a signal is sent to computer 38 instructing it to commence the static testing procedure. Note that the HGA remains affixed in fixture 30 during the transition from the reflow soldering operation to the static testing operation.

In the preferred embodiment, a single computer 38 manages the static testing for both of the static testers associated with the pair of work stations 12a and 12b. The computer monitor 39 has a display which is divided down the middle. The right side of the display shows the results of the static test for the work station 12b on the right, and the left side of the display shows the results of the static test for the work station 12a on the left. Based on the results of the static test displayed, the operator can immediately check for visible soldering or wiring defects by looking through the microscope 34. If there are soldering or wiring defects, these defects can be readily and easily repaired at the work station without having to remove the HGA from the fixture 30. The operator simply indexes the X-Y positioning stage through the steps until the desired solder pad is positioned under reflow tip 33. The operator then "touches up" or completely redoes the soldering operation for that particular magnetic wire and solder pad.

FIG. 4 shows a more detailed view of test fixture 30. Test fixture 30 firmly holds head gimbal assembly 15 and electronic circuitry 22. Head gimbal assembly 15 is coupled to electronic circuitry 22 by flex circuit 20. Test fixture 30 is mounted onto X-Y positioning stage 31 by means of block 70. The wires running from the heads of head gimbal assembly 15 are soldered onto the solder pads of flex circuit 20 by solder tip 33. Soldering mechanism 71 heats and lowers solder tip 33 to reflow the wires onto flex circuit 20. An operator can peer through microscope 34 to monitor and check the soldering operation. After soldering has been completed, head gimbal assembly 15 is subjected to static testing. This is accomplished by moving X-Y positioning stage 31 to position test fixture 30 so that head gimbal assembly 15 interacts with disk simulator 37 and pogo pin probe 72 is depressed by block 70. The depression of pogo pin 72 activates a switch which initiates the static test procedure. The test results are sent through cable 73 to instrumentation stored under table 14.

FIG. 5 is a block diagram of one embodiment for the static tester. Computer 38 is typically an IBM compatible computer that runs the static testing for the two work stations. Computer 38 continuously monitors the start switches 42 to determine when to start the static test procedure. Computer 38 performs the static test on a "first come first serve" basis. Computer monitor 39 displays textual information concerning the static test results. The results of the last static test which was performed at that work station will remain displayed on its half of the computer monitor 39 until a new test is performed at that work station. An elapsed time indicator on computer monitor 39 informs the operator of the time duration since the last static test was performed. This prevents confusion in the event of a switch failure (i.e., if the start switch fails to close, the results of an old static test will stay on the screen, and the operator may not notice this failure without some indication of the age of the displayed static test result).

Interface board 40 is a circuit board which plugs into a slot inside computer 38. In the currently preferred embodiment, interface board 40 is a Metra-Byte PI012 digital I/O card. This allows computer 38 to control test board 41. Test board 41 is a circuit board which performs the analog static tests under computer 38's control. Test board 41 also converts the analog static test results to a format which computer 38 can interpret. Test board 41 is electrically coupled to start switch 42, disk simulator 43, and connection 44 to X-Y positioning stage. Start switch is placed so that when the X-Y positioning stage assumes the static test position, start switch 42 is triggered, thereby signaling computer 38 to initiate the static testing procedure. Disk simulator 43 is a set of magnetic circuits that are placed in close proximity to the heads of the HGA when the X-Y positioning stage is in the static test position. This stimulates and provides magnetic coupling to the heads. The connection 44 to X-Y positioning stage is a set of spring (pogo) pins which enables electrical coupling between test board 41 and the subassembly unit under test (UUT) 45. The UUT 45, in the present case, is the HGA. Connection 44 is also electrically coupled to the voice coil circuit 46. Voice coil circuit 46 provides a means for magnetically stimulating the voice coil on the HGA so that its function can be tested.

FIG. 6 shows a more detailed block diagram of the static test setup as given in FIG. 5, with a further breakdown of electrical circuits and components. A description of the new blocks are as follows. The P.C.S. 50 is coupled to computer 38 and is used to collect the test data and update test software when needed. The Test Fixture ID 51 is a circuit which returns a number unique to that test fixture anytime upon request by the computer. The Power Supply 52 is controlled by the computer to supply either 0.0, 3.5, or 5.0 volts to the UUT. A Current Sensor 53 monitors the current drawn from the power supply 52 by the UTT. A current equal to or exceeding 60 milliamps indicates a failure. This indication is sent to the computer. The I Set 54 is a circuit which controls the write current of the UUT 45. Programmable Oscillator 55 allows the computer to select between 100, 400, and 800 kHz output frequency, depending on the test being performed. Multiplexer Driver 56 buffers the signal from the oscillator and sends the signal to the disk simulator for testing the heads of the UUT 45.

The Threshold Latch Converter 57 receives a number from the computer and converts the number to an analog voltage which is used as a test limit by the Compare to Threshold 58 and Compare to Threshold and Phase 59 circuits. The Compare to Threshold 58 circuit compares the signal received from the High Gain Diff Amp 60 to the level from the Threshold Latch Converter 57. The Compare to Threshold 58 circuit records any events that exceed the test limit after being reset by the Interface Board 40. The High Gain Diff Amp 60 amplifies the signal coming from the read channel of the UUT 45 to levels usable by the Compare to Threshold 58 circuit. The Compare to Threshold and Phase 59 circuit sends a signal to computer 38 indicating that the voice coil signal from the UUT 45 is of a proper amplitude and its phase matches that of the Programmable Oscillator 55. The Diff Amp 61 amplifies the signal coming from the voice coil of the UUT 45 to levels usable by the Compare to Threshold and Phase 59 circuit. The Voice Coil Driver 62 buffers the signal from Programmable Oscillator 55 used to drive the Voice Coil Circuit 46.

The lines interfacing the UUT and the static tester are described below:

| | |
|---|---|
| WC: | Write current line of the UUT. |
| +5V/Gnd: | Power supply connections to the UUT. |
| WUS: | Write unsafe line from the UUT. |
| HD sel: | Lines used to select which head of the UUT is being tested. |
| R/W: | Used to put the UUT into read or write mode. |
| CS: | Allows control of the UUT's idle mode. |
| RD: | Read channel outputs form the UUT. |
| VC: | Voice Coil connections of the UUT. |
| WD: | Write data input to the UUT. |
| A: | Connection to the voice coil stimulator. |

The currently preferred embodiment of the static tester performs the following four tests. A Short Circuit Test is performed by applying five volts to the actuator. A current draw of less than sixty milliamps indicates that there is no short circuit. Otherwise, the UUT fails this test. The Check Voice Coil Test applies a fluctuating magnetic field across the voice coil while the voice coil leads are loaded with a resistance approximately equal to the typical coil resistance. The amplitude and phase of the signal across the load is checked. In the Read Test, a fluctuating magnetic field is applied to each head. A response is checked to determined whether it exceeds a data threshold voltage. The magnetic fields are removed, and a response exceeding a noise threshold level is checked for all the heads. Next, the Write Unsafe (WUS) line from the HGA is checked. Lastly, in the Write Test, the WUS line is checked to determine whether it is low when a write data frequency of 400 kHz is applied. The power supply voltage is then lowered to 3.5 volts; the WUS line for each head should go high. The power supply voltage is restored to 5 volts; the WUS lines should be high for each head. The idle mode is initiated, and the WUS is checked.

Thus, in the manufacturing process of hard disk drive systems, a station which integrates the functions of reflow soldering and static testing of Head Gimbal Assemblies has been described.

What is claimed is:

1. An apparatus for soldering and testing a head gimbal assembly for use in a hard disk drive system, comprising:
   a fixture for holding and positioning said head gimbal assembly during said soldering and said testing operations;
   a means for moving said fixture to a soldering position;
   a solder tip for soldering a wire to an object when said fixture is moved to said soldering position;
   a means for moving said fixture from said soldering position to a testing position;
   a means for testing said head gimbal assembly, said testing means comprising a switch means which initiates said testing operation when said fixture is moved to said testing position, an interface for electrically interfacing said head gimbal assembly held in said fixture to electronic test circuitry for performing a plurality of electrical tests on said head gimbal assembly, a computer for controlling said electronic test circuitry, and a display device for displaying results of said testing operation.

2. The station as claimed in claim 1 wherein said wires are reflow soldered to said object, said reflow soldering including the steps of preparing said object with solder, positioning a portion of said wire directly over said solder, heating said solder tip, pressing said solder tip down onto said wire and said solder such that said wire's insulation is melted and said wire is soldered to said object, and removing any excess wire.

3. The station as claimed in claim 2 wherein each of said wires is electrically coupled at one end to a head on said head gimbal assembly and the other end reflow soldered to said object comprising a solder pad on a flex circuit attached to said head gimbal assembly, said flex circuit conducting electrical signals between said wires and electrical assemblies of said disk drive system.

4. The station as claimed in claim 3 wherein said solder tip is mounted so that it is positioned above said fixture, said solder tip capable of being lowered until it makes contact with and reflow solders said wire and said solder pad.

5. The station as claimed in claim 4 further comprising an X-Y positioning stage mechanically coupled to said fixture, said X-Y positioning stage moving said fixture along an X and Y axis in a horizontal plane such that each of said solder pads can be positioned under said solder tip.

6. The station as claimed in claim 5 further comprising a foot pedal operated by a user's foot for lowering said solder tip, said lowering of said solder tip tracking depression of said foot pedal, said solder tip is heated when said foot pedal is depressed completely.

7. The station as claimed in claim 5 further comprising a position controller which steps said X-Y positioning stage according to a software program whereby each solder pad is successively positioned directly under said solder tip.

8. The station as claimed in claim 5 further comprising a foot switch operated by a user's foot for signaling said position controller to move said X-Y positioning stage to position the next solder pad under said solder tip.

9. The station as claimed in claim 5 further comprising a microscope mounted to said station whereby said microscope is positioned over said fixture such that a user may visually inspect said head gimbal assembly held by said fixture through said microscope.

10. The station as claimed in claim 3 wherein said testing includes a short circuit test, a voice coil test, a read test, and a write test.

11. A process for soldering and testing a head gimbal assembly for use in a hard disk drive system, comprising the steps of:
   placing said head gimbal assembly onto a fixture for holding and positioning said head gimbal assembly during said soldering and said testing operations;
   positioning said fixture holding said head gimbal assembly in a soldering position;
   soldering a wire to a solder pad on a flex circuit, said wire being electrically coupled to a head on said head gimbal assembly, said flex circuit conducting electrical signals received from said wire to electrical circuitry in said hard disk drive system;
   positioning said fixture holding said head gimbal assembly in a testing position, wherein said head gimbal assembly is electrically interfaced with electronic test circuitry and a switching means in activated which initiates said testing operation;
   testing said head gimbal assembly, said testing performed by said electronic test circuitry and controlled by a computer; and
   displaying results of said testing operation.

12. The soldering and testing process as claimed in claim 11 wherein said soldering step is a reflow soldering step.

13. The soldering testing process as claimed in claim 12, wherein said soldering step is comprised of mounting a solder tip so that said soldering tip is positioned above said fixture, said solder tip capable of being lowered so that one of said wires is reflow soldered onto one of said solder pads.

14. The soldering and testing process as claimed in claim 13 further comprising a means for successively positioning said solder pads underneath said solder tip.

15. The soldering and testing process as claimed in claim 14 further comprising the step of depressing a foot pedal to lower said solder tip so as to reflow solder said wire onto said junction pad.

16. The soldering and testing process as claimed in claim 14 further comprising the step of activating a foot switch to signal a controller to position the next solder pad under said solder tip.

17. The soldering and testing process as claimed in claim 12 wherein said testing step includes a short circuit test, a voice coil check, a read test, and a write test.

18. In assembling and testing hard disk drive systems, a work station which integrates soldering and testing operations for a subassembly unit of said hard disk drive system, wherein said soldering and said testing operations are performed on said subassembly unit without having to remove said subassembly unit from said station and wherein a single operator performs said soldering and said testing operations, said station comprising:

a means for holding said subassembly unit;
a means for moving said subassembly unit to a soldering position, wherein said soldering operation is performed, said moving means also moving said subassembly unit to a testing position wherein said testing operation is performed;
a solder mechanism for performing said soldering operation;
a switch means for initiating said testing operation, said switch means being activated when said subassembly unit is moved to said testing position;
a means for testing said subassembly unit; and
a means for displaying results of said testing operation.

19. The assembling and testing station of claim 18 further comprising a solder tip located near said holding means such that an operator can move said solder tip in order to solder a wire to a solder pad.

20. The assembling and testing station of claim 19 wherein said soldering means includes a reflow soldering means.

21. The assembling and testing station of claim 20 further including a means for moving said holding means such that a plurality of solder pads are successively positioned in line with said soldering tip.

22. The assembling and testing station of claim 21 wherein said testing means includes a short circuit test, a voice coil test, a read test, and a write test.

23. The assembling and testing station of claim 22 wherein said subassembly unit is comprised of a head gimbal assembly.

* * * * *